Dec. 27, 1938. D. S. BARROWS 2,141,680
CUSHIONING MECHANISM
Filed Dec. 12, 1934 2 Sheets-Sheet 1
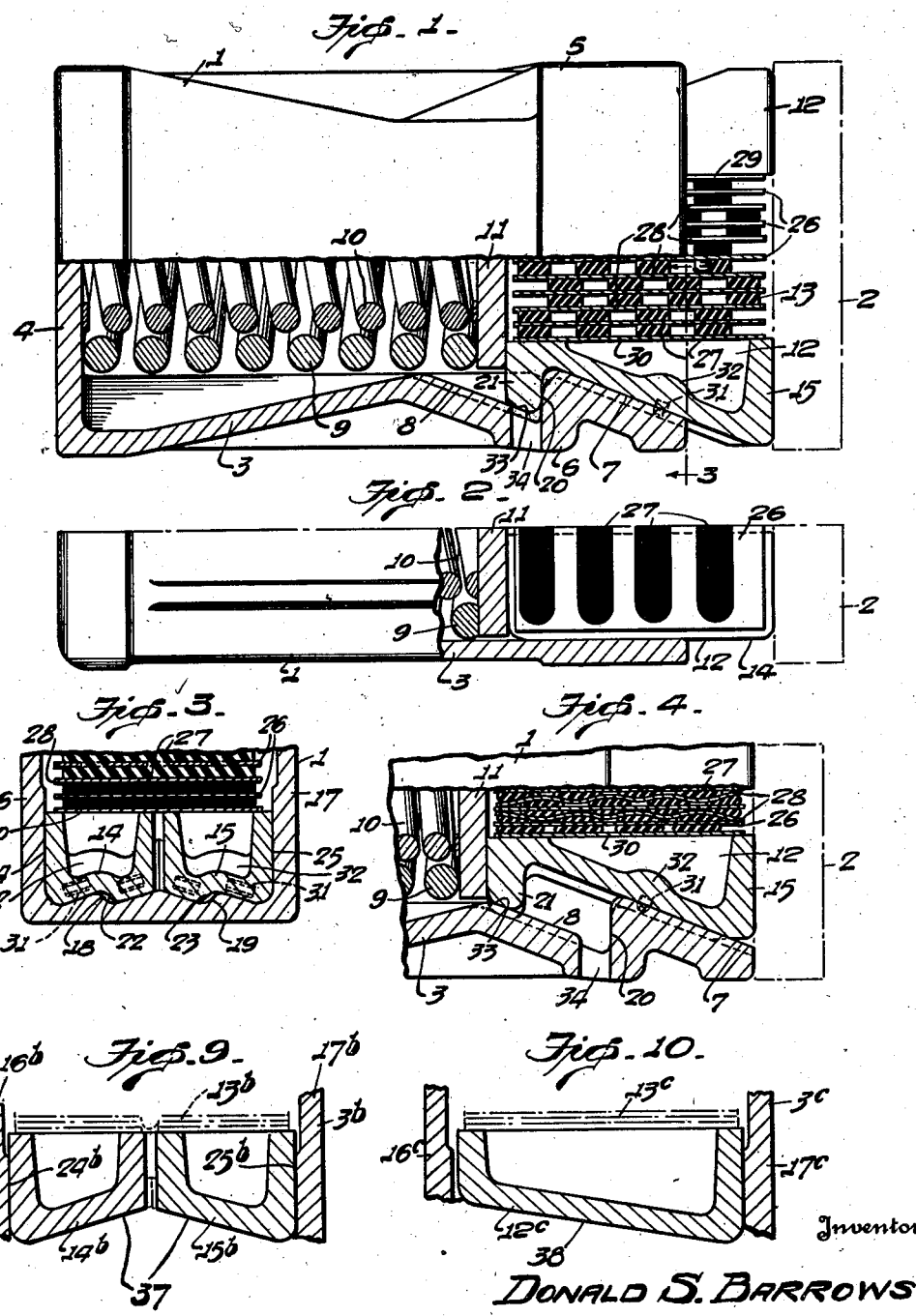
Inventor
DONALD S. BARROWS
By Ernest F. Mechlin
Attorney

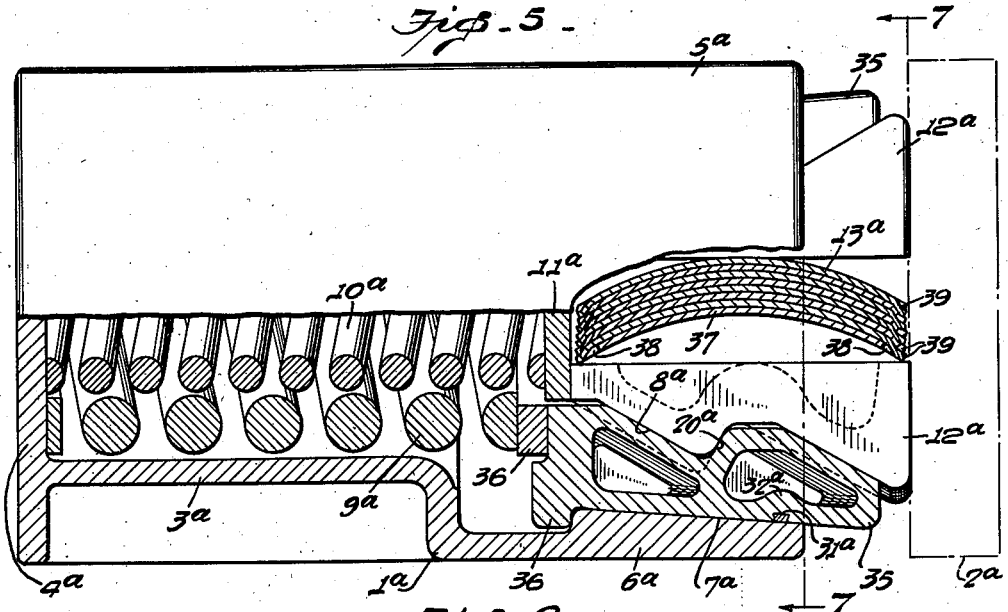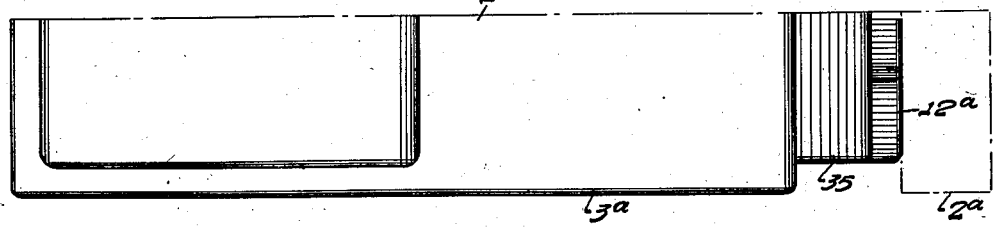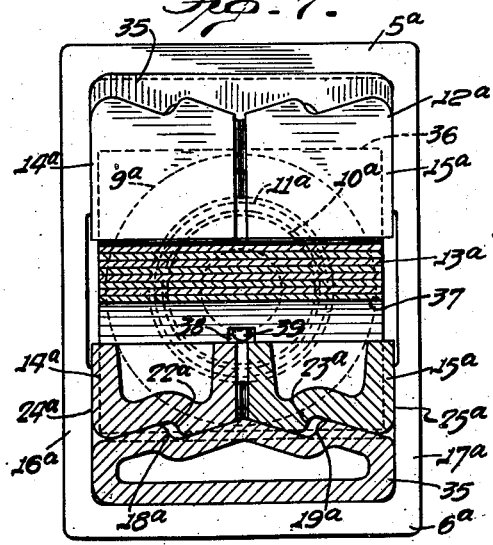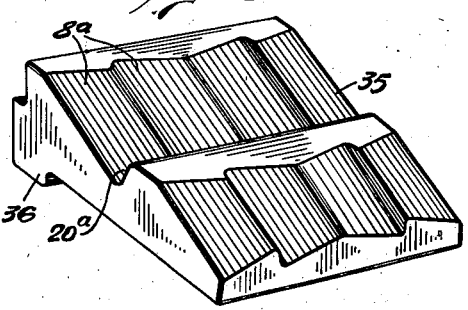

Patented Dec. 27, 1938

2,141,680

UNITED STATES PATENT OFFICE 2,141,680

CUSHIONING MECHANISM

Donald S. Barrows, Rochester, N. Y., assignor, by mesne assignments, to Gould Coupler Corporation, Rochester, N. Y., a corporation of New York Application December 12, 1934, Serial No. 757,233

18 Claims. (Cl. 213—39)

This invention relates to cushioning mechanism and, more particularly, to a friction draft gear adapted for application between the draft or center sills of a railway vehicle for receiving and cushioning draft and buffing forces.

The principal object of my invention, generally considered, is the provision of an improved friction draft gear in which the area of the friction surfaces is increased without increasing the size of the gear.

Another object of my invention is the provision of a friction draft gear comprising a housing with four side walls, open at one end and provided with friction surfaces inclined longitudinally and transversely on one pair of said side walls adjacent said open end, and friction wedges associated therewith and formed with correspondingly inclined friction surfaces so that when actuated by resilient means therebetween they not only frictionally engage the inclined housing friction surfaces but also friction surfaces on the other pair of side walls which are not necessarily inclined.

A further object of my invention is the provision of a friction draft gear comprising a housing with longitudinally and transversely inclined friction surfaces on a pair of oppositely disposed side walls near an open end thereof, a pair of split wedges engaging said friction surfaces and actuated by springs so that when in service the halves of the split wedges are forced away from one another, on account of the transverse inclination of the engaged surfaces on the housing, so as to bear against the sides of the housing which connect the inclined portions thereof, thereby increasing the frictional bearing area, without increasing the size of the gear or the capacity of the springs.

A still further object of my invention is the provision of a friction draft gear comprising a housing, a pair of side walls of which are engaged by friction shoes which are, in turn, engaged by wedges urged apart by resilient means, one release spring being provided for said shoes and another for said wedges.

An additional object of my invention is the provision of a resilient device comprising a stack of spring metal plates separated by resilient rubber units staggered so that the rubber units at one side of a plate are opposite the spaces between said rubber units at the other side of a plate, thereby producing under pressure the contraflexing of said intermediate plates, and adding the deformation and capacity of the latter to the total travel and capacity of the group.

Another object of my invention is the provision of slots in the friction surfaces of wedges for friction draft gears for receiving lead or other means for preventing scoring of the friction surfaces, the walls of said wedges receiving said slots being formed so as to prevent weakening at said slots.

A further object of my invention is to provide a cushioning mechanism involving friction elements urged into engagement with friction surfaces on an enclosing housing or shoes engaging said housing by curved plate springs, which springs are formed with corrugations or embossments providing means whereby they are properly nested with respect to one another and shifting therebetween is prevented.

Other objects and advantages of the invention relating to the particular arrangement and construction of the various parts will become apparent as the description proceeds.

Referring to the drawings illustrating my invention, the scope whereof is defined by the appended claims:—

Figure 1 is a partial side elevation and partial vertical longitudinal central section of a friction draft gear or cushioning mechanism embodying my invention.

Fig. 2 is a partial plan and partial central horizontal sectional view of the mechanism of Fig. 1.

Fig. 3 is a partial end elevation and partial transverse sectional view on the line 3—3 of Fig. 1, looking in the direction of the arrows.

Fig. 4 is a fragmentary sectional view corresponding to Fig. 1, but showing the position assumed by the wedges and resilient means therebetween when the gear is compressed.

Fig. 5 is a view corresponding to Fig. 1, but showing another embodiment of my invention.

Fig. 6 is a fragmentary plan of the form of my invention shown in Fig. 5.

Fig. 7 is a transverse sectional view on the line 7—7 of Fig. 5, looking in the direction of the arrows.

Fig. 8 is a perspective of one of the friction shoes shown in Figs. 5, 6 and 7 removed from the gear.

Fig. 9 is a fragmentary view corresponding to Figures 3 and 7, but showing a further embodiment of my invention.

Fig. 10 is a fragmentary view corresponding to Figures 3 and 7, but showing a still further embodiment of my invention.

Referring to the drawings in detail, like parts being designated by like reference characters, and first considering the embodiment of my invention illustrated in Figs. 1 to 4, inclusive, there is shown a cushioning mechanism 1 specially adapted for use as a friction draft gear for railway vehicles and desirably designed so that it will fit in a draft gear pocket of normal size. In Fig. 1 the gear is shown associated with a rear follower 2 and is particularly adapted for use with the usual type of Farlow attachments embodying a horizontal yoke, a front follower, a supporting key for said front follower and connecting the same with the draft sills, and another key serving for connecting the yoke with the coupler. The afore-mentioned parts, in addition to the draft gear and rear follower, are not shown because they are parts of a usual form of draft rigging with which my draft gear may be used, although it will be understood that said gear is adapted for use with other forms of draft rigging or any other service, if desired.

The form of my invention now being considered comprises a friction casing, housing or barrel 3 closed at one end by a wall 4, which end, in the present embodiment, is illustrated as that at the front, although it is obvious my gear is adapted for use turned end to end, if desired. The open end of the housing 3 is preferably formed with flaring or inclined side walls 5 and 6, said walls providing a plurality or pair of sets of inclined friction surfaces 7 and 8. On account of this construction, the housing 3 is formed with what is, in effect, a double bell-mouth, and the portion inwardly of said bell-mouth may be hollow to receive release springs 9 and 10 which resist inward movement of the intermediate follower 11 and friction wedges 12, which wedges are urged apart and into engagement with the friction surfaces of the housing by resilient means 13.

In the present embodiment, each wedge 12 is split or formed as a pair of complementary wedge members 14 and 15, and the inclined friction surfaces 7 and 8, instead of merely sloping longitudinally of the housing, slope transversely, that is, they are preferably inclined, as illustrated in Fig. 3, from the longitudinal vertical central plane toward the side walls 16 and 17 of the housing which connect the walls carrying the inclined surfaces 7 and 8. In order to avoid considerable variation in the thickness of the inclined walls 5 and 6 of the housing, the surfaces are stepped transversely as well as longitudinally, thereby providing the longitudinally extending shoulders 18 and 19, in addition to the transversely extending shoulders 20, which latter serve as abutments for the inner portions 21 of the wedges 14 and 15, which limit outward movement of said wedges with respect to the housing when the parts are assembled.

The inclined friction surfaces on the wedges 14 and 15 are, of course, formed to correspond with the inclined friction surfaces 7 and 8 on the housing, except that slight clearances are desirably provided between the shoulders 22 and 23 on the wedges and the shoulders 18 and 19 on the housing, so that said wedge shoulders will not normally engage said housing shoulders, but instead the friction surfaces 24 and 25 on the outer side walls of the wedges will be forced into engagement with the corresponding inner surfaces of the side walls 16 and 17 of the housing, which surfaces are shown generally parallel to the longitudinal axis of the housing, thereby resulting in greatly augmenting the effective frictional engagement between the wedges and housing for the cushioning of draft and buffing forces.

Instead of the customary curved plate springs between the friction wedges 12, I show, in the present embodiment, a cushioning unit 13 comprising a plurality of sheet steel plates 26 to each of which is secured an elongated resilient rubber pad 27 extending on each side of each plate. Adjacent plate and rubber combinations are separated by a spring steel plate 28, and the whole stack is disposed between upper and lower spring plates 29 and 30, the latter of which are, respectively, engaged by the upper and lower wedges 12, each of which, as previously explained, comprises a half wedge or wedge member 14 and 15. The resilient rubber strips 27 are so positioned on alternate plates 26 that when assembled they are staggered, as illustrated, with the strips of one plate opposite the spaces between the strips on the adjacent plate, whereby, when the resilient device is compressed, as shown most clearly in Figure 4, the intermediate plates 28 are bent to sinuous configurations or contraflexed, thereby resulting in adding the deformation and capacity of said plates to the total travel and capacity of the group.

In order to provide for smooth action of the wedges 14 and 15 on the corresponding friction surfaces of the housing, I desirably form slots 31 in the inclined walls of the wedges and fill said slots with lead, in accordance with the teachings of the Davis et al. Patent No. 1,982,575, of November 27, 1934. In order to avoid weakening the wedges at said slots, I desirably increase the thickness of said walls back of said slots, as indicated by bosses designated by the reference character 32, thereby insuring that the same shall be more nearly uniform in strength throughout than if the slots were formed in walls of uniform thickness.

The inner portions 21 of the wedges 14 and 15 which provide shoulders engaging the shoulders 20 on the housing also desirably provide auxiliary friction surfaces 33 inclined to correspond with the main friction surfaces on the wedges 12 and normally engaging the friction surfaces 8 on the housing, thereby further augmenting the frictional capacity of the gear. The housing is desirably formed with apertures 34, adjacent the shoulders 20, in the walls which carry the inclined friction surfaces, which apertures may serve for the reception and removal of the auxiliary follower 11, or merely for allowing foreign matter, such as dirt or rust, to drop out of the housing while the gear is in service, when said gear is used with the walls 5 and 6 disposed, respectively, as the upper and lower walls. However, it will be understood that the gear may be used with these walls disposed in vertical rather than generally horizontal position. It will also be understood that although I have shown the strips 27 of resilient rubber disposed parallel to one another, yet I do not wish to be limited to this arrangement, as said strips may be concentric, or otherwise arranged with respect to one another, and the strips on one plate may be arranged in line with those on the adjacent plate rather than staggered, if desired, within the broad scope of my invention. It will also be understood that although I have shown the resilient means including rubber as disposed between the wedges of a friction draft gear, I do not wish to be limited to this use of such a resilient device, as said device may, if desired, be employed as a gear releasing means in lieu of coil springs, or as a means for resiliently supporting a bolster from an associated side frame in lieu of the usual bolster springs.

Referring now to the embodiment of my invention illustrated in Figures 5 to 8, inclusive, there is shown a cushioning mechanism $1^a$ especially adapted for use as a railway draft gear with which is associated a rear follower $2^a$, as in the preceding embodiment. The gear comprises a housing, casing or barrel $3^a$ closed at one end by a wall $4^a$, and the other or open end of which is formed with walls $5^a$ and $6^a$ on which are provided friction surfaces $7^a$ which diverge slightly toward the open end of the housing. Engaging said inclined friction surfaces $7^a$ are friction shoes 35, which shoes may be considered as part of the housing $6^a$ and have their adjacent surfaces diverging outwardly or toward the open end of the gear to provide the movable stepped friction surfaces $8^a$, which also desirably incline from the vertical longitudinal central plane, like the relatively fixed housing surfaces 7 and 8 of the preceding embodiment, leaving a transverse shoulder $20^a$ and longitudinal shoulders $18^a$ and $19^a$ therebetween.

The hollow portion of the housing toward the transverse wall $4^a$ receives release springs $9^a$ and $10^a$, the former of which resists inward movement of intermediate follower means 36 and the associated shoes 35, and the latter of which resists inward movement of the intermediate follower $11^a$ and associated friction wedges $12^a$, which wedges are urged apart and into engagement with the friction surfaces on the shoes 35 by curved plate springs $13^a$.

As in the preceding embodiment, the wedges $12^a$ are split, or each formed as a pair of complementary wedge members $14^a$ and $15^a$, and the inclined friction surfaces $8^a$ slope transversely as well as longitudinally, as illustrated in Figure 7, from the longitudinal central vertical plane toward the side walls $16^a$ and $17^a$ of the housing which connect the walls carrying the inclined surfaces $7^a$. The transversely extending shoulders $20^a$ serve as abutments for corresponding portions on the wedges $14^a$ and $15^a$ to limit outward movement thereof with respect to the friction shoes 35 and housing, outward movement of the friction shoes with respect to the housing being limited by shouldered portions 36 adjacent the inner ends thereof.

The inclined friction surfaces on the wedges $14^a$ and $15^a$ are, of course, formed to correspond with the inclined friction surfaces $8^a$ on the shoes 35, except that slight clearances are desirably provided between the shoulders $22^a$ and $23^a$ on the wedges and the shoulders $18^a$ and $19^a$ on the shoes, so that said wedge shoulders will not normally engage said shoe shoulders, but instead the friction surfaces $24^a$ and $25^a$ on the outer side walls of the wedges will be forced into engagement with the corresponding inner surfaces of the side walls $16^a$ and $17^a$ of the housing, thereby resulting in greatly augmenting the effective frictional engagement between the wedges and housing.

On account of the fact that the wedges $12^a$ are disposed closer to one another than normal because of the employment of shoes 35, I may use only one group of curved plate springs, as illustrated in Figure 5. Each leaf of said group of springs may be corrugated so as to nest with the adjacent leaf, as illustrated, and as described and claimed in the Suckow Patent No. 1,884,913, with the exception of the leaf 37 at the concave side of the group of springs, which leaf is desirably slotted, as indicated at 38, rather than corrugated, to receive the corrugation or embossment 39 of the adjacent leaf, thereby avoiding the necessity of grooving the engaged wedge $12^a$ for the reception of an embossment on said plate.

Lead inserts $31^a$ may be employed in friction members, as in the preceding embodiment, with the walls carrying such inserts thickened, as indicated at $32^a$, to avoid weakening due to the provision of notches for such inserts.

When sufficient compressive force is applied to the ends of the gear of Figures 5 to 8, inclusive, as, for example, when said gear is subjected to draft or buffing forces, relative movement is effected between the housing $3^a$ and the follower $2^a$ which may, depending on the initial compression of the resilient means $13^a$, whether curved plate springs as illustrated or a device such as represented by the reference character 13 of the first embodiment, cause a slight movement of the wedges $12^a$ with respect to the shoes 35, which thus form, in effect, a part of the housing $6^a$. While it is true that the wedges or inner members $12^a$ are acted upon by the small capacity inner coil $10^a$, while the shoes or outer wedges 35 are acted upon by the heavier outer coil $9^a$, the capacity of the release spring $9^a$ is so much less than that of the resilient means $13^a$, that simultaneous inward movement of the wedges $12^a$ and shoes 35 is insured, after the first preliminary tightening, the outer side walls of the wedges $12^a$ developing considerable supplemental capacity by sliding on the inner surfaces of the side walls $16^a$ and $17^a$.

When the shoes 35, or shouldered portions 36 thereof, engage the abutment or corresponding inwardly disposed shouldered portion of the housing, the wedges $12^a$ can then be moved on the shoes 35, as if they were integral, rather than movable, parts of the housing, until the gear is fully compressed. The action described gives a relatively easy starting curve, with high capacity developing near the end of the stroke.

When the compressive force on the gear is released, the wedges $12^a$ first move outwardly until the shoulders thereon engage the corresponding shoulders on the shoes, causing the shoes to move outwardly therewith to fully released position illustrated in Figure 5.

In Figure 9, I have shown a further embodiment of my invention in which the transverse stepping and the formation of the longitudinally extending shoulders on the friction wedges is omitted, each wedge $14^b$ and $15^b$ merely having continuous transversely sloping friction surfaces 37 which either engage friction surfaces on associated shoes or on an associated housing $3^b$, as will be understood. The friction surfaces $24^b$ and $25^b$ on the outer side walls of the wedges $14^b$ and $15^b$ are forced into engagement with the side walls $16^b$ and $17^b$ of the housing $3^b$ by the resilient means $13^b$.

In Figure 10, I show a still further embodiment of my invention in which the friction wedges $12^a$ are not split, as in the preceding embodiments, but are rather of a width corresponding approximately with the distance between the walls $16^c$ and $17^c$ of the housing $3^c$, and are provided with longitudinally and transversely inclined friction surfaces 38 which engage corresponding friction surfaces on associated shoes or on the housing $3^c$, said wedges $12^c$ also frictionally engaging the wall $17^c$ of said housing on account of the pressure of the associated springs or resilient device 13c.

Although preferred embodiments of my invention have been illustrated, it will be understood that modifications may be made within the spirit and scope of the appended claims. It will also be understood that curved plate springs as commonly employed, one form being shown in Figs. 5 to 8, inclusive, may be substituted for the resilient device 13 of Figs. 1 to 4, inclusive.

I claim:—

1. Cushioning mechanism comprising a housing with a wall having an inner surface extending generally parallel to its longitudinal axis, oppositely disposed friction surfaces inclined longitudinally and transversely of said housing, said friction surfaces sloping toward said parallel wall, wedges formed with correspondingly inclined friction surfaces, engaging said oppositely disposed friction surfaces, and other friction surfaces on said wedges engaging said inner wall surface and resilient means acting on said wedges for urging them into engagement with said inclined friction surfaces and said longitudinal wall surface.

2. Cushioning mechanism comprising a housing formed with two pairs of oppositely disposed side walls, one pair of said side walls being formed with friction surfaces inclined longitudinally and transversely of said housing, said transverse surfaces sloping toward at least one of said other walls, wedges formed with correspondingly inclined friction surfaces and other surfaces, and resilient means acting on said wedges for urging the inclined friction surfaces thereof into engagement with the corresponding surfaces on said housing and said other surfaces on said wedges into engagement with one of said other housing walls.

3. Cushioning mechanism comprising a housing formed with two pairs of oppositely disposed side walls, one pair of side walls being formed with friction surfaces inclined longitudinally of the housing and also sloping both ways toward the other pair of side walls, two pairs of wedges engaging the walls with said inclined friction surfaces and said other walls, and resilient means acting on all of said wedges.

4. Cushioning mechanism comprising a housing defined by side walls, shoes slidable longitudinally on one pair of oppositely disposed side walls, and each shoe formed with friction surfaces inclined longitudinally and transversely of said housing, said transverse surfaces sloping toward one of the other side walls, wedges disposed between said shoes and formed with correspondingly inclined friction surfaces, and resilient means disposed between said wedges for urging them into engagement with said shoes and the other of said side walls.

5. Cushioning mechanism comprising a housing formed with side walls and oppositely disposed longitudinally inclined friction surfaces, shoes slidable longitudinally on said friction surfaces and each formed with friction surfaces inclined longitudinally and diverging transversely of said housing, wedges disposed between said shoes and formed with correspondingly inclined and diverging friction surfaces, and resilient means disposed between said wedges for urging them into engagement with said shoes and into sliding frictional engagement with each adjacent side wall.

6. Cushioning mechanism comprising a housing defined by side walls, shoes slidable longitudinally on one pair of oppositely disposed side walls and each formed with friction surfaces on opposite sides thereof, at least one of said surfaces on each shoe being inclined longitudinally and transversely of said housing, the transverse surfaces sloping toward another pair of side walls, wedges disposed between said shoes and formed with correspondingly inclined friction surfaces engaging said inclined friction surfaces on the shoes, resilient means disposed between said wedges for urging them into engagement with said shoes and other pair of side walls, the opposite faces of said shoes being urged into engagement with said housing, and release springs for said shoes and wedges.

7. Cushioning mechanism comprising a housing defined by side walls, one pair of oppositely disposed side walls having interior longitudinally inclined friction surfaces, shoes with outer correspondingly inclined friction surfaces engaging said friction surfaces on the housing and each formed with other friction surfaces inclined longitudinally and sloping transversely of said housing toward at least one of the other side walls, wedges disposed between said shoes and formed with correspondingly inclined and sloping friction surfaces, resilient means disposed between said wedges for urging them into engagement with said shoes and at least one of the other side walls of said housing, resilient means for effecting release of said wedges, and other resilient means for effecting release of said shoes.

8. Cushioning mechanism comprising a housing formed with oppositely disposed friction surfaces sloping transversely of the housing toward adjacent side walls, wedges with corresponding friction surfaces adapted to move transversely of the housing, and resilient means acting on said wedges for urging them into engagement with the friction surfaces and said adjacent side walls of said housing, said resilient means comprising a plurality of spaced metal plates and rubber elements interposed therebetween, some of said rubber elements being in staggered relation with some of the other rubber elements.

9. Cushioning mechanism comprising a housing formed with two pairs of oppositely disposed side walls, one pair of side walls being formed with friction surfaces inclined longitudinally and sloping transversely of the housing, wedges each frictionally engaging an adjacent side wall and formed with corresponding friction surfaces, and a resilient device disposed between said wedges for urging them into engagement with both pairs of side walls, said device comprising a stack of spring metal plates separated by resilient rubber units staggered so that the units on one side of a plate are opposite the spaces between said units on the other side of a plate, whereby when the mechanism is compressed contraflexing of intermediate plates between the rubber units takes place, thereby adding the deformation and capacity of said plates to the total travel and capacity of the group.

10. A cushioning device comprising a series of metal plates with spaced resilient rubber elements secured thereto and extending on opposite sides of each plate, each plate being positioned with respect to the adjacent plate so that the units on one plate are disposed opposite the spaces between the units on the adjacent plate, and spring metal plates separating said plates and rubber units, whereby when pressure is applied to the plates and rubber units, intermediate plates are contraflexed to provide an increase in travel capacity.

11. Cushioning mechanism comprising a housing, friction wedges movable vertically and transversely of said housing, and plate springs disposed between said wedges for urging them apart and into frictional engagement with said housing, said springs comprising a group concavely curved toward one of said wedges, all of the springs in said group except that engaging one of said wedges having corrugated portions at their outer ends providing interlocking nibs and pockets for nesting said springs with respect to one another, said plate spring engaging said wedge having slots receiving the nibs on the adjacent plate to provide for interlocking therewith, the portions of the wedge engaging said last-named spring being formed with flat spring-engaging portions to permit said spring to slide with respect to said spring-engaging portion.

12. Cushioning mechanism comprising a housing defined by two pairs of oppositely disposed side walls, one pair of side walls being formed with transverse and longitudinally stepped surfaces, each being inclined at less than 90° to the adjacent side wall, a plurality of wedges having stepped surfaces engaging the stepped surfaces of the housing and additional surfaces engaging the other pair of side walls, and a resilient means interposed between said wedges, thereby urging said wedges into engagement with the two pairs of oppositely disposed side walls.

13. Cushioning mechanism comprising a housing defined by oppositely disposed side walls, a plurality of shoes engaging one pair of oppositely disposed side walls, surfaces on said shoes diverging transversely of the housing toward another pair of side walls, wedges interposed between said shoes, resilient means disposed between said wedges for urging said wedges into engagement with the shoes and the other pair of side walls, and the shoes into engagement with the said pair of oppositely disposed walls, resilient means within the housing engaging said shoes and additional resilient means within the housing engaging said wedges for effecting release of said shoes and wedges.

14. Cushioning mechanism comprising a housing defined by a pair of side walls and a pair of other walls, a plurality of shoes, each of which is adapted to engage one of said other walls, surfaces on said shoes sloping toward each side wall, a plurality of pairs of oppositely disposed wedges interposed between said shoes, resilient means interposed between the oppositely disposed pairs of wedges for urging said wedges into engagement with said shoes and each adjacent side wall and said shoes into frictional engagement with said other walls, individual follower plates engaging said shoes and wedges, resilient means engaging the follower plate for said shoes, and additional resilient means engaging the follower plate for said wedges.

15. Cushioning mechanism comprising a housing formed with two pairs of oppositely disposed side walls, one pair of side walls being formed with friction surfaces inclined longitudinally of the housing and sloping transversely of the housing toward the other pair of side walls, two pairs of wedges resiliently urged into engagement with the inclined and sloping surfaces and said other walls, and resilient means within the housing for urging the wedges outwardly of the housing.

16. Cushioning mechanism comprising a housing formed with two pairs of oppositely disposed side walls, one pair of side walls being formed with friction surfaces sloping transversely of the housing in both directions toward the other pair of side walls, two pairs of wedges engaging the sloping surfaces and said other walls, and resilient means acting on all of the wedges.

17. Cushioning mechanism comprising a housing defined by two pairs of oppositely disposed side walls, one pair of side walls being formed with surfaces stepped longitudinally of the housing and sloping in both directions transversely of the housing to the other pair of side walls, a plurality of wedges having stepped and sloping surfaces engaging the correspondingly formed surfaces on the housing, and additional surfaces engaging the other pair of side walls, and resilient means interposed between said wedges for urging said wedges into engagement with all of said walls.

18. Cushioning mechanism comprising a housing formed with two pairs of oppositely disposed side walls, one pair of side walls being formed with friction surfaces sloping transversely of the housing in both directions toward the other pair of side walls, two pairs of wedges engaging the sloping surfaces and said other walls, and resilient means acting on all of said wedges, said resilient means comprising spaced resilient rubber elements separated by spring metal plates, the rubber elements on one side of each spring plate being positioned so that said elements are disposed opposite the space between the elements on the other side of the plate, whereby when pressure is applied to the plates and rubber elements the plates are contraflexed to provide an increase in the travel and capacity of the resilient means.

DONALD S. BARROWS.